United States Patent [19]

Igarashi

[11] Patent Number: 4,992,970
[45] Date of Patent: Feb. 12, 1991

[54] SYSTEM FOR READING OR SETTING PRINTED CIRCUIT BOARDS VOLTAGE OF COMPUTER BY SUPPORT PROCESSOR

[75] Inventor: Tetsu Igarashi, Tokyo, Japan

[73] Assignee: Kabushiki Kaisha Toshiba, Kawasaki, Japan

[21] Appl. No.: 122,132

[22] Filed: Nov. 17, 1987

[30] Foreign Application Priority Data

Nov. 18, 1986 [JP]  Japan .................. 61-272942

[51] Int. Cl.⁵ ........................................... G06F 11/00
[52] U.S. Cl. ............................. 364/900; 364/921.8; 364/926; 364/929.4; 364/943.9; 364/945.4; 364/483; 371/15.1
[58] Field of Search ............... 364/900 MS File, 580, 364/579, 552, 551.01, 550; 324/73 AT, 73 PC; 371/20, 16, 15

[56] References Cited

U.S. PATENT DOCUMENTS

| | | | |
|---|---|---|---|
| 4,138,599 | 2/1979 | Munter | 371/15 X |
| 4,204,249 | 5/1980 | Dye et al. | 371/15 X |
| 4,499,549 | 2/1985 | Bartlett | 364/900 X |
| 4,578,773 | 3/1986 | Desai et al. | 364/900 |
| 4,701,870 | 10/1987 | Mogi et al. | 364/580 |
| 4,729,124 | 3/1988 | Hansel et al. | 371/18 |
| 4,750,136 | 6/1988 | Arpin et al. | 364/200 X |
| 4,774,656 | 9/1988 | Quatse et al. | 371/16 X |
| 4,807,161 | 2/1989 | Comfort et al. | 364/550 |

FOREIGN PATENT DOCUMENTS 61-214038 9/1986 Japan .
61-273677 12/1986 Japan .
61-273678 12/1986 Japan .
61-273679 12/1986 Japan .
61-273680 12/1986 Japan .

Primary Examiner—Eddie P. Chan
Assistant Examiner—Paul Kulik
Attorney, Agent, or Firm—Oblon, Spivak, McClelland, Maier & Neustadt

[57] ABSTRACT

In a computer system, a board voltage reading circuit or a board voltage setting circuit is formed on a board, to effectively read and set the power voltage of the board carrying various types of circuit elements. Board identification number data and board voltage reading mode data are entered into the board voltage reading circuit, and the board voltage setting data is entered into the board voltage setting circuit. These data are entered through a support processor by a display in a console. Only when the board identification number input from support processor and board identification number preset are in agreement each other, the board voltage is read by the board voltage readig circuit. The result is displayed by the display. The board voltage setting circuit is used for setting the power voltage of the board.

7 Claims, 4 Drawing Sheets

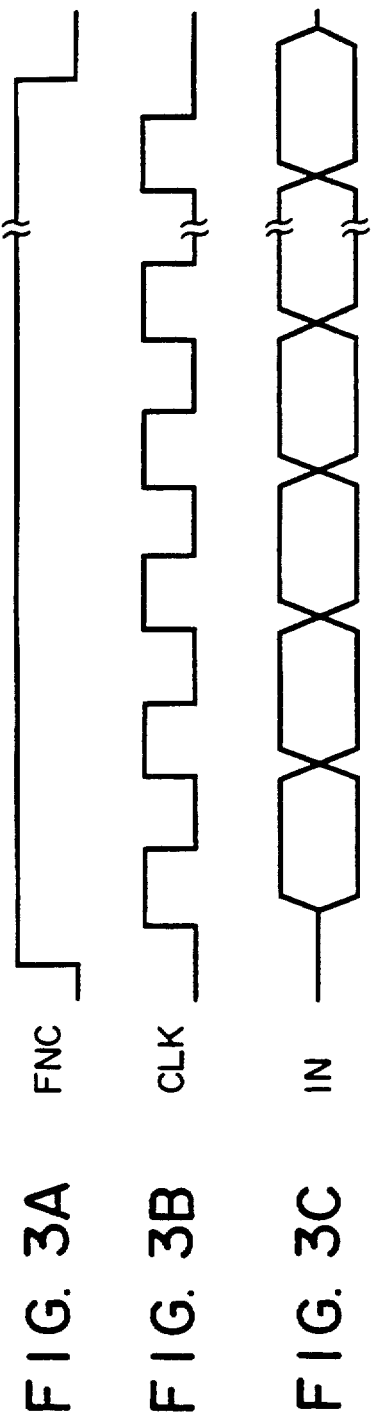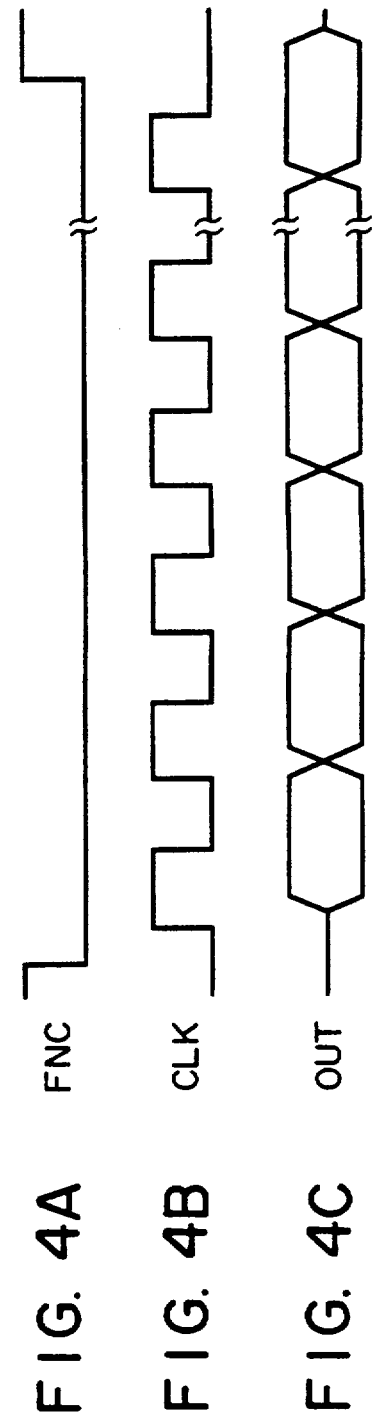

SYSTEM FOR READING OR SETTING PRINTED CIRCUIT BOARDS VOLTAGE OF COMPUTER BY SUPPORT PROCESSOR

BACKGROUND OF THE INVENTION

This invention relates to a system for reacting or setting the voltage of the printed circuit boards of a computer with a plurality of boards with various types of circuit elements by a support processor.

In electronic devices, boards with various types of circuit elements thereon are generally covered with a chassis. Therefore, it is very difficult for operators to access to the board from outside, in order to check the DC power voltage of the boards. In the voltage margin test, in which the voltage is varied minutely, it takes a lot of time to check the voltage, because the power voltage detection needs a specially designed voltage measurement instrument.

For this reason, there is a demand to effectively read or set the board voltage without the specially designed voltage measuring instrument.

SUMMARY OF THE INVENTION

Accordingly, an object of this invention is to provide a system for reading or setting the voltage of printed circuit boards of a computer by a support processor.

According to one aspect of this invention, there is provided a system for reading the voltage of printed circuit boards of a computer by a support processor comprising: first registering means for storing a board identification data input by the support processor through an input data line, converting means for converting the voltage data of the board to a digital voltage data, second registering means for storing the digital voltage data of the converting means, comparing means for comparing the board identification data of the first registering means with a special board identification data preset in the board, and gate means for outputting the digital voltage data stored in the second registering means to the support processor through an output data line, when the two identification data are in agreement in the comparing means.

According to another aspect of this invention, there is provided a system for reading the voltage of printed circuit boards of a computer by a support processor comprising: first registering means for storing a board identification data and a selecting data input by the support processor through an input data line, converting means for converting the voltage data of the board to a digital voltage data, selecting means for outputting one of a board data of the board and the digital voltage data of the converting means in accordance with the selecting data of the first registering means, second registering means for storing a data of the selecting means, comparing means for comparing the board identification data of the first registering means with a special board identification data preset in the board.

According to a further object of this invention, there is provided a system for setting the voltage of printed circuit boards of a computer by a support processor comprising: first registering means for storing a board identification data input by the support processor through an input data line, comparing means for comparing the board identification data of the first registering means with a special board identification data preset in the board, and second registering means for outputting a setting voltage data input by the support processor to the board through the input data line, when the two identification data are in agreement in the comparing means.

BRIEF DESCRIPTION OF THE DRAWINGS

FIGS. 3A to 3C and 4A to 4C show waveforms for the input/output operation of the board voltage reading circuit of FIG. 2.

DETAILED DESCRIPTION OF THE PREFERRED EMBODIMENTS

Some specific embodiments of this invention will be described referring to the accompanying drawings.

Figure 1:
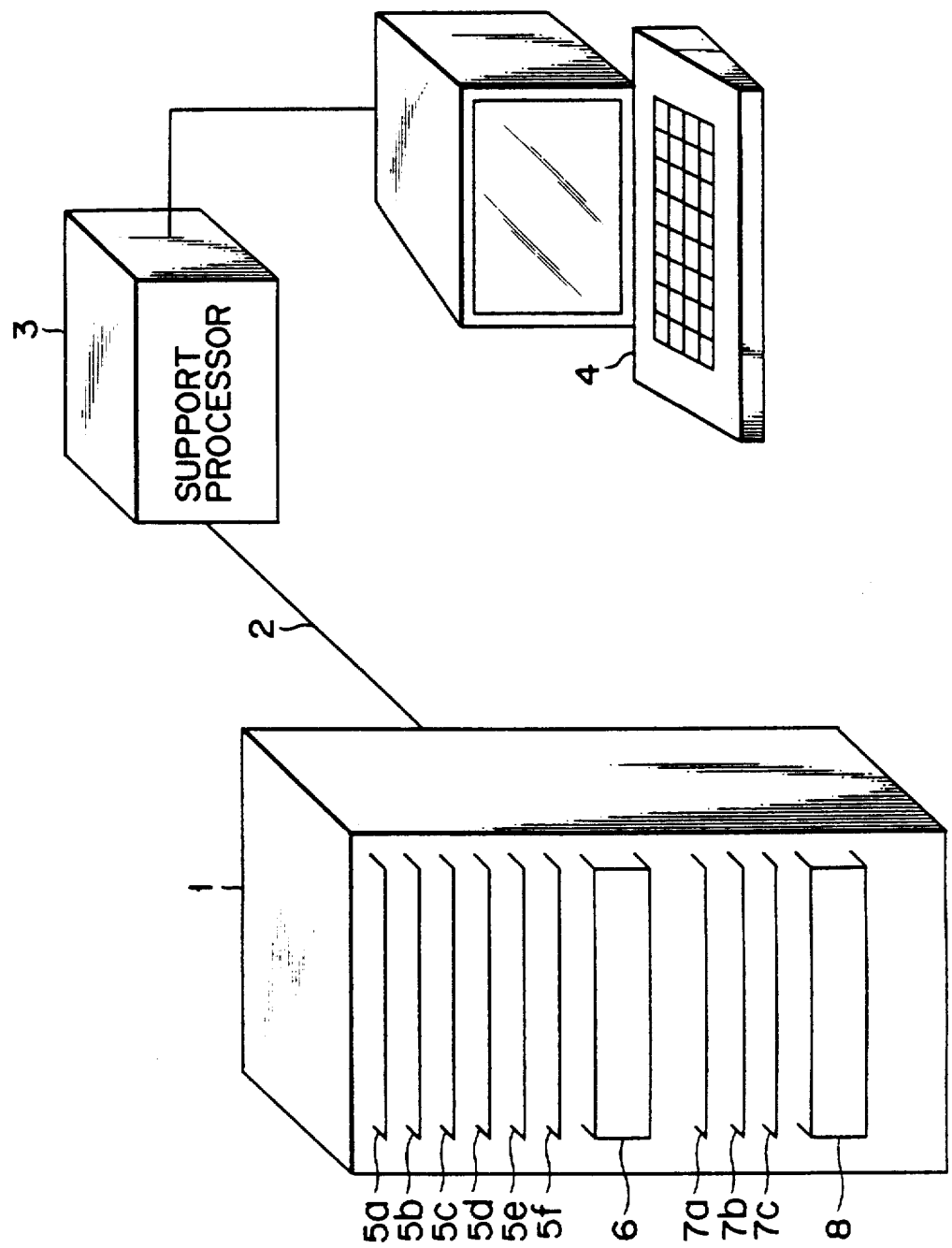
FIG. 1 schematically illustrates a board voltage reading or setting system with boards with a board voltage measuring circuit or a board voltage setting circuit, which is an embodiment of this invention.
Figure 2:
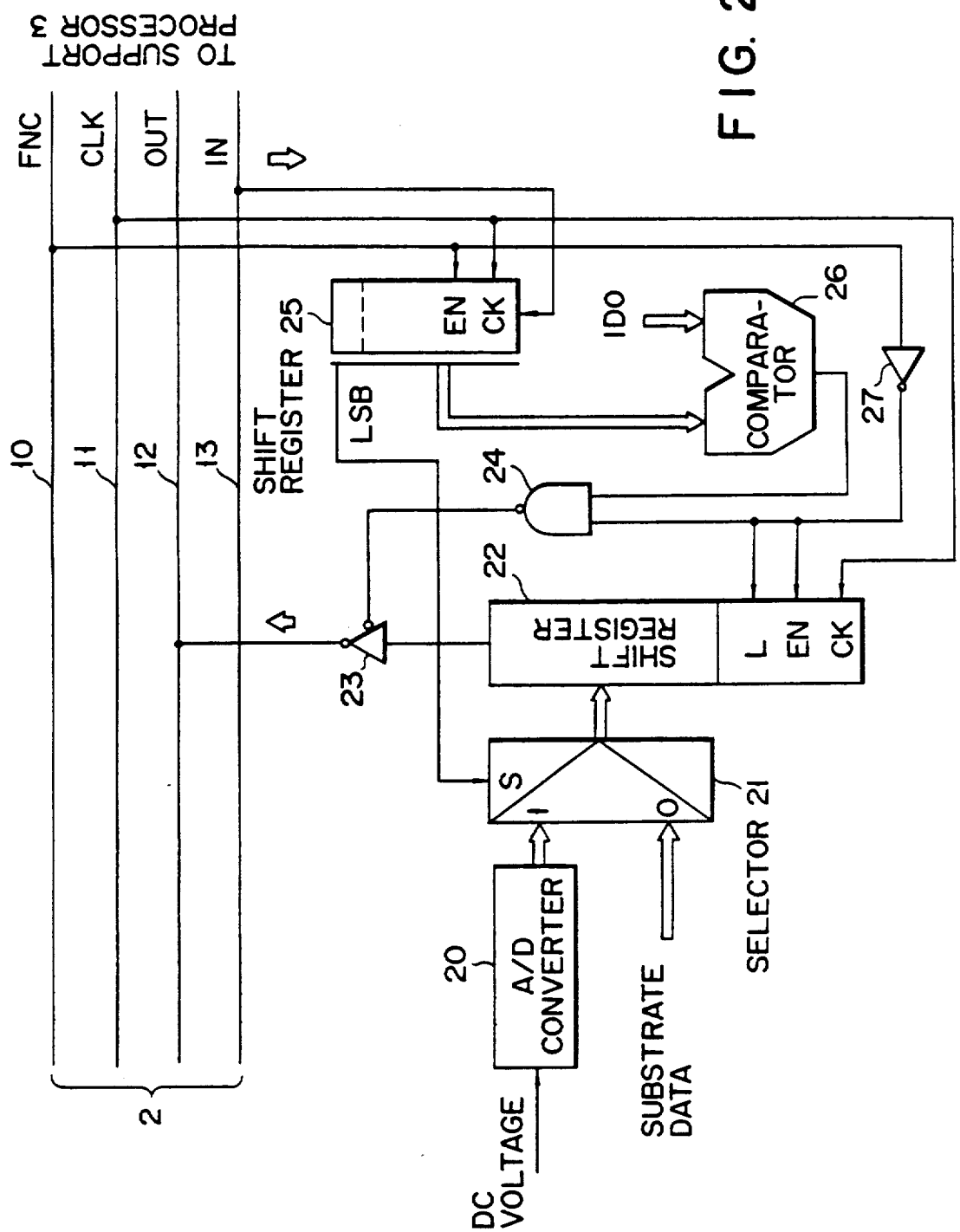
FIG. 2 shows a circuit arrangement of a board voltage reading circuit according to one embodiment of the present invention.

In FIG. 1, CPU 1 is provided with power sources 6 and 8, boards 5a to 5f supplied with a first DC power from power source 6, and boards 7a to 7c supplied with a second DC power from power source 8. A board voltage reading circuit as shown in FIG. 2, together with other various circuit elements, is carried on each of boards 7a to 7c. The board voltage reading circuit of each of these boards 5a to 5f and 7a to 7c is connected to serial bus 2, which is also connected to support processor 3. Support processor 3 reads in board voltages, board information, and the like, and this is made independently of CPU 1. Support processor 3 is coupled with display 4 in a console as an input/output device.

Serial bus 2 contains function line 10 for transferring function signal FNC to designate the operation mode of the board voltage reading circuit, clock line 11 for transferring clock signal CLK, which is different from the system clock signal, and two serial data lines 12 and 13. Serial data line 12 is used for transferring serial output data OUT from the board voltage reading circuit. Another serial data line 13 is used for transferring serial input data IN to the board voltage reading circuit.

Power voltage output from power source 6 or 8 is converted into a digital signal by analog to digital (A/D) converter 20. Selector 21 selects either the value output from A/D converter 20 or the data of board information. The board data is the status information containing the manufacturing numbers, board control information representing change and modification matters, and error information when the board is operated.

Shift register 25 receives at the input terminal serial input data IN on serial data line 13, from the least significant bit (LSB). This register contains shift enable terminal EN connected to function line 10, and clock terminal CK connected to clock line 11. The bit data except the LSB held in shift register 25 and board identification number IDo assigned to each board are compared with each other by comparator 26. NAND gate 24 receives the output signals from inverter 27 and comparator 26.

Shift register 22 holds the select output data from selector 21, and serially outputs the held data. The serial output data from shift register 22 is output to serial data line 12 from output driver 23 in accordance with the output signal of NAND gate 24. Shift register 22 contains the clock terminal CK connected to clock line 11, the load terminal L connected to the output of inverter 27, and shift enable terminal EN.

The operation of the board voltage reading circuit will be described. For the explanation of the operation, an instance is used in which support processor 3 reads the DC power voltage of board 5a. The data representing board identification (BID) number of board 5a is entered from display 4 with console. Display 4 with console requests support processor 3 to read in the power voltage of board 5a. Upon this request, support processor 3 serially transfers bit by bit to the serial data line 13, the serial input data IN made up of the BID data plus data "1" for selecting the board voltage or the board data. Simultaneously, support processor 3 transfers clock signal CLK synchronized with the serial input operation, to clock line 11, as shown in FIG. 3, and function signal FNC to function line 10.

The serial input data IN, which has been transferred from support processor 3 to serial line 13, is led to the serial input terminal of shift register 25 of the board voltage circuits of those boards 5a to 5f and 7a to 7c. The function signal FNC on function line 10 and the clock signal CLK on clock line 11 are led to the terminals EN and CK of shift register 25. Under this condition, function signal FNC of FIG. 3A has been set to "1", representing the board voltage reading mode. When function signal FNC led to the terminal EN of shift register 25 is "1", the serial input operation of shift register 25 is permitted. The serial input data IN has to be led to the serial input terminal of shift register 25 from serial data line 13 bit by bit in synchronism with clock signal CLK, which is led to the terminal CK of shift register 25. Through such an operation, shift register 25 holds the data made up of the BID data and selecting data, which have been serially transferred thereto.

Of the held data of shift register 25, the LSB, i.e., the selecting data, is used as a select control signal of selector 21. Selector 21 is coupled at one terminal with the output data of A/D converter 20, i.e., the board power voltage, and coupled at the other terminal with the board data. When the selecting data held in shift register 25 is "1", selector 21 selects the output data from A/D converter 20. When it is "0", the selector selects the board data.

In this instance, the selecting data is "1". Accordingly, the output data from A/D converter 20 is selected, and led to the parallel input terminal of shift register 22. Of the data held in shift register 25, the data except LSB, i.e., the BID data of board 5a, is led to one of the terminals of comparator 26. Preset board identification number IDo is led to the other terminal of comparator 26. Comparator 26 compares those input data, and when these are in agreement each other, outputs "1".

Support processor 3 transfers to serial bus 2 the data consisting of the board 5a identification number data and the selecting data, and board voltage reading mode data. Then, function signal FNC on function line 10 is set to "0". This is done to permit the board voltage reading circuit to output the read value. Support processor 3 transfers clock signal CLK with pulses whose number is equal to that of bits making up the board voltage read value.

Function signal FNC input to function line 10 from support processor 3 is led to inverter 27 of the board voltage reading circuit put on each of the boards 5a to 5f and 7a to 7c. Function signal FNC is inverted by inverter 27 and led to terminals L and EN of shift register 22. Clock signal CLK entered from support processor 3 to clock line 11 is led to terminal CK of shift register 22. As shown in FIG. 4, when function signal FNC is "0", terminal L of shift register 22 is "1". As a result, the loading to shift register 22 is permitted, so that the output data from selector 21, i.e., the board voltage, is loaded to shift register 22. Terminal EN of shift register 22 is set to "1", to permit the serial output operation from shift register 22. The board voltage value loaded into shift register 22 is serially output bit by bit in synchronism with clock signal CLK led to terminal CK.

The voltage value output from shift register 22 is led to output driver 23. Output driver 23 is in an output-permission condition when the output signal from NAND gate 24 is "0". Under this condition, the serial output data from shift register 22 is output to serial data line 12. NAND gate 24 receives the output signals from comparator 26 and inverter 27. The output signal of inverter 27 is "1" when function signal FNC is "0". The output signal of NAND gate 24 is "0" only for the board whose comparator 26 outputs "1", i.e., board 5a. In this embodiment, when the board voltage is read, support processor 3 transfers the BID number data. When the board voltage is output, the power voltage value supplied to the board with the BID number is output to serial data line 12 as serial output data OUT, from output driver 23. Support processor 3 fetches the serial output data OUT on data line 12, and this data is displayed by display 4 on the console.

The reading of board voltage is performed as mentioned above. If "0" is used for the selecting data, the board data of each board can be obtained. While in the above-mentioned embodiment, the board voltage reading circuits are respectively put on all of the boards, these circuits may be formed in only some of the boards, if necessary.

Figure 5:
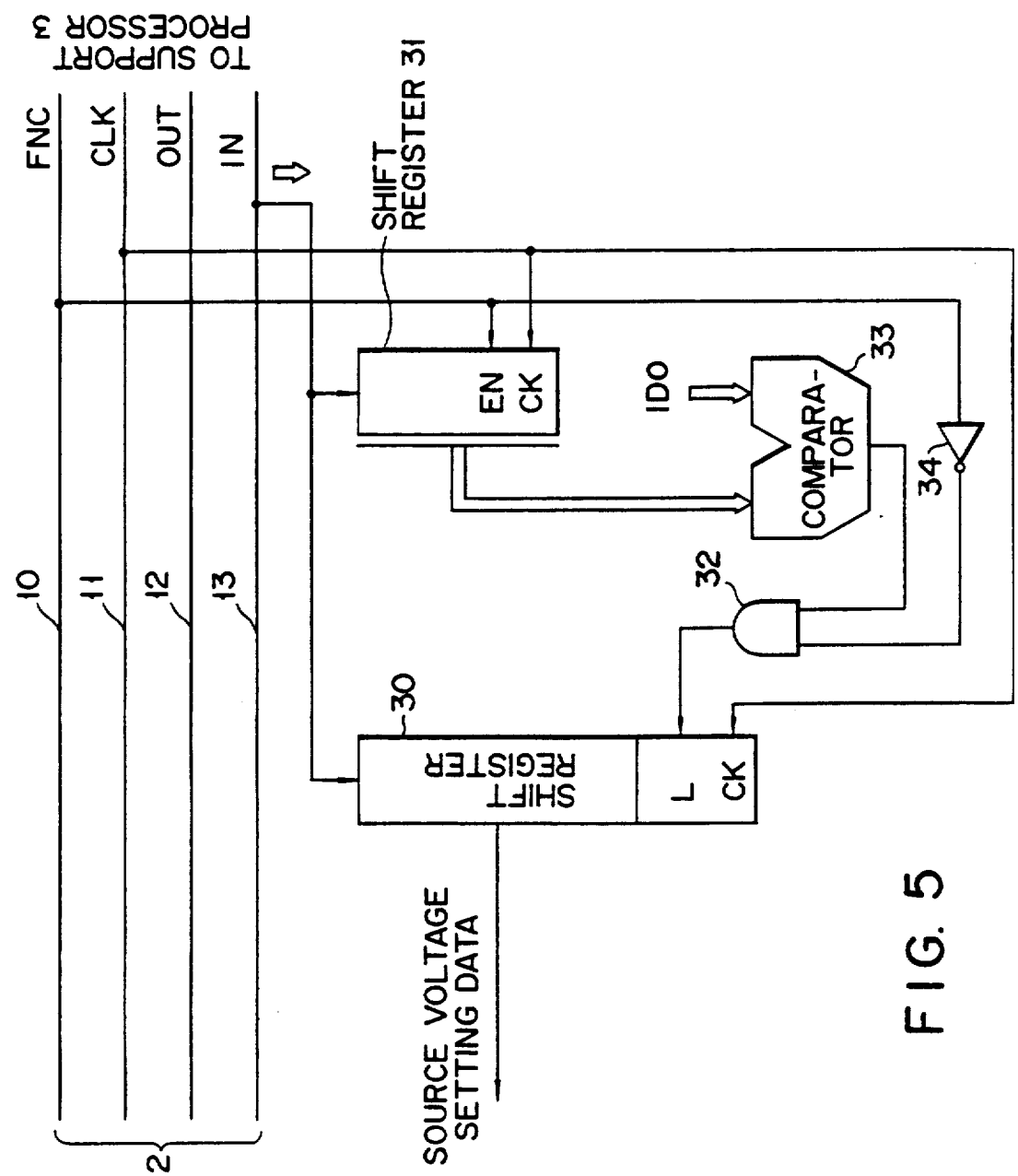
FIG. 5 shows a circuit arrangement of a board voltage setting circuit according to another embodiment of this invention.

Setting of the power voltage value for the board may be made within the scope of this invention. This is shown in FIG. 5. As can be seen, the FIG. 2 circuit is used as a board voltage setting circuit, and is arranged into power supplies 6 and 8. The following is an explanation of how the power voltage of power supply 6 is set.

In FIG. 5, the BID number data of power supply 6 and the board voltage setting data of power supply 6 are serially input to serial data line 13 from support processor 3. Support processor 3 supplies clock signal CLK, which is synchronized with the serial input operation, to clock line 11, and function signal FNC to function line 10.

The BID number data on serial data line 13, as input from support processor 3, is led to the serial input terminal of shift register 31. Function signal FNC and clock signal CK, as input from support processor 3, are coupled respectively with terminals EN and CK of shift register 31.

The BID number data held in shift register 31 is input to one of the terminals of comparator 33. The other terminal of comparator 33 is coupled with the BID number IDo preset to each board. Comparator 33 compares both the data, and produces a "1" signal when both the data are in agreement with each other.

Function signal FNC on function line 10 as input from support processor 3 is input to inverter 34 of the board voltage setting circuit, and is inverted by inverter 34, and input to one of the input terminals of AND gate 32. The other input terminal of AND gate 32 receives the output signal of comparator 33.

Clock signal CLK on clock line 11, as input from support processor 3, is applied to terminal CK of shift register 30. When terminal L of shift register 30 is "1", the loading to shift register 30 is permitted, so that the board voltage setting data on serial data line 13 is loaded into shift register 30. The board voltage setting data loaded to shift register 30 is output by clock signal CLK applied to terminal CK of shift register 30.

In this way, the setting of the board voltage is performed.

The present invention is not limited to the above-mentioned specific embodiments, but also may variously be changed and modified within the spirit and the scope of this invention.

What is claimed is:

1. A system for reading a voltage of a printed circuit board, the system comprising:
   a support processor for producing board identification data and for inputting voltage data;
   first registering means for storing board identification data and selecting data from said support processor through an input data line;
   converting means for converting voltage of said printed circuit board to voltage data representing voltage supplied to said printed circuit board;
   selecting means for selecting one of board data of said printed circuit board and voltage data converted by said converting means in accordance with said selecting data stored in said first registering means;
   second registering means for storing said data selected by said selecting means;
   comparing means for comparing said board identification data stored in said first registering means with special board identification data preset in said printed circuit board; and
   gate means for outputting said data stored in said second registering means to said support processor through an output data line, when said sorted board identification data are identical to said preset special board identification data.

2. The system according to claim 1, wherein said input data line and said output data line include a serial line, respectively.

3. The system according to claim 1, wherein said first registering means and said second registering means include a shift register, respectively.

4. The system according to claim 1, wherein said support processor is connected to a terminal comprised by input means for inputting said board identification data and display means for displaying said board identification data and said voltage data.

5. The system according to claim 1, wherein one of said first registering means and said second registering means is enabled in accordance with reading mode data from said support processor through a function line.

6. The system according to claim 1, wherein the second registering means includes storing means for storing voltage setting data from the support processor.

7. The system according to claim 6, wherein the gate means includes means for outputting the stored voltage setting data, when the voltage setting data is stored in the storing means, and when the stored board identification data are identical to the preset special board identification data.

* * * * *